United States Patent [19]

Karlsson

[11] Patent Number: 5,736,690
[45] Date of Patent: Apr. 7, 1998

[54] MUFFLER WITH CATALYTIC CONVERTER

[75] Inventor: Egon Karlsson, Jonkoping, Sweden

[73] Assignee: Aktiebolaget Electrolux, Stockholm, Sweden

[21] Appl. No.: 785,035

[22] Filed: Jan. 17, 1997

Related U.S. Application Data

[63] Continuation-in-part of PCT/SE95/00803, Jun. 29, 1995.

[30] Foreign Application Priority Data

Jul. 18, 1994 [SE] Sweden ............................ 9402506
Jan. 17, 1996 [SE] Sweden ............................ 9600204

[51] Int. Cl.⁶ .................................................... F01N 3/02
[52] U.S. Cl. ........................ 181/230; 181/231; 60/299; 60/302
[58] Field of Search ................................. 181/230, 231, 181/240, 264, 282, 283; 60/299, 302

[56] References Cited

U.S. PATENT DOCUMENTS

| | | | |
|---|---|---|---|
| 4,370,855 | 2/1983 | Tuggle | 181/240 X |
| 5,139,107 | 8/1992 | Nagai | 181/240 |
| 5,440,083 | 8/1995 | Masuda | 181/240 |
| 5,451,728 | 9/1995 | Chandler et al. | 181/230 |
| 5,521,339 | 5/1996 | Daspain et al. | 181/230 |

*Primary Examiner*—Khanh Dang
*Attorney, Agent, or Firm*—Pearne, Gordon, McCoy & Granger LLP

[57] ABSTRACT

Muffler with catalytic converter (1) composed of a muffler housing (2) and a lid (3) which seals the muffler housing. A catalytic converter element is mounted in the lid and an exhaust pipe (5) leads from this element out of the muffler (1). The exhaust gas pipe (5) is located entirely in the lid, so that the exhaust gases are released via the lid (3).

15 Claims, 1 Drawing Sheet

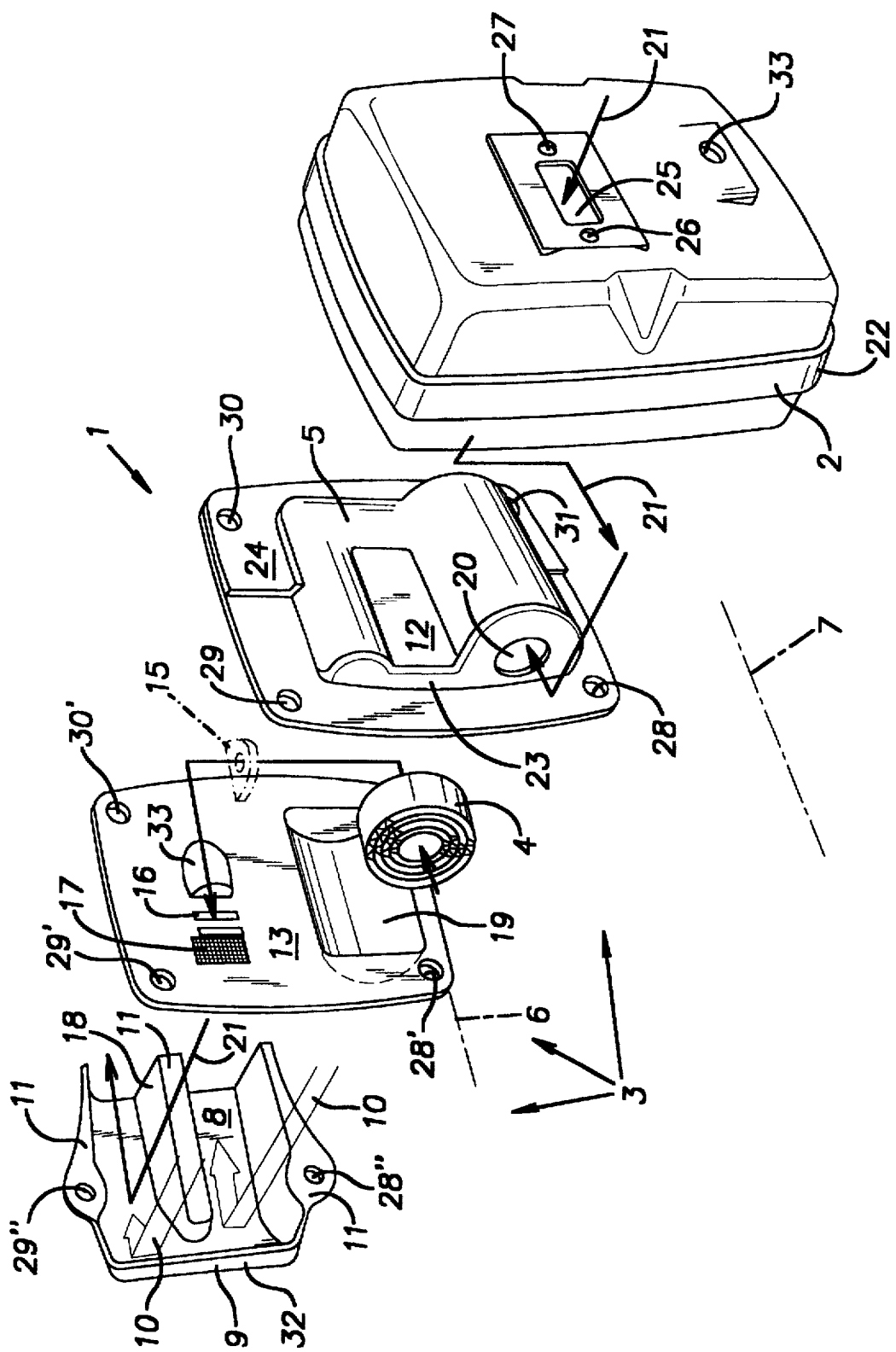

MUFFLER WITH CATALYTIC CONVERTER

CROSS-REFERENCE TO RELATED APPLICATIONS

This is a Continuation-in-Part of pending PCT International Application No. PCT/SE95/00803, filed on Jun. 29, 1995, claiming priority from Swedish Application No. SE 9402506-1, filed Jul. 18, 1994.

BACKGROUND OF THE INVENTION

1. Field of the Invention

The present invention generally relates to mufflers and, more specifically, to a muffler including a catalytic converter.

2. Description of Related Art

Small internal combustion engines have comparatively high exhaust emissions. This is particularly true for two-stroke engines, as combustion is less complete than in four-stroke engines. Increased demands concerning exhaust emissions from small engines have caused catalytic converter exhaust cleaning to be used with small engines, including small engines for handheld portable tools such as chain saws. However, for handheld power tools, the demand for low weight and small size of the exhaust cleaning equipment makes the problem especially difficult. A couple of different solutions for so called catalytic mufflers have evolved principally for chain saws. These mufflers are mounted directly to the exhaust port of the cylinder. In Swedish Patent SE 467314, the catalytic converter is arranged in a muffler that is at least partly welded gas-tight, and the converter is in spaced relationship to the innerwalls on all sides of the converter element to create a heat isolation. But this easily leads to a big and heavy catalytic muffler.

Swedish patent application SE 465834 shows a catalytic muffler where the converter unit is placed in closer relationship to the lid of the muffler. On the outside of the lid is a cooler, composed of several plates, fastened to lead off the heat from the converter. The exhaust gas is let out via an exhaust pipe, which is fastened in the inner part of the muffler and debouches into its back corner, that is at a considerable distance from the lid. Cooling air from the fan of the engine is led past the mouth of the exhaust pipe. As the exhaust pipe here debouches at a considerable distance from the lid it is difficult to efficiently use the air from the cooling fan both to blend with the exhaust gases and to cool the cooling plates on the lid.

SUMMARY OF THE INVENTION

It is an object of the present invention to substantially reduce the above outlined problems and at the same time provide a good exhaust gas cleaning.

The above object is achieved by a muffler with catalytic converter, in accordance with the invention, wherein an exhaust gas pipe from the catalytic converter element leading out of the muffler is located completely in the lid, so that the exhaust gases are released via the lid. Both the converter element and the exhaust gas pipe are located entirely in the lid, and in close relationship to each other. Therefore, it is possible and simple, with the aid of cooling air from the fan of the engine, to arrange both a cooling of the converter element and a cooling and mixing of the exhaust gases leaving the muffler. Also, there is no long exhaust gas pipe leading away from the lid, but the exhaust gases are let away via the lid. In this way, the present invention provides a compact and lightweight catalytic converter muffler.

Furthermore, the converter element according to the present invention is preferably so located in the lid that the direction in which the element is most sensitive to vibrations is essentially parallel with the crankshaft of the engine. The fastening of the converter element and the design of the connecting exhaust pipe is preferably made through depressions in plates turned towards each other.

BRIEF DESCRIPTION OF THE DRAWING

The invention will be described in closer detail in the following by way of various embodiments thereof with reference to the accompanying drawing figure, wherein:

FIG. 1 shows an exploded perspective view of a catalytic muffler according to the present invention.

DETAILED DESCRIPTION OF THE PREFERRED EMBODIMENTS

With reference to FIG. 1, a catalytic muffler 1 according to the present invention is composed of two mutually demountable main parts, a muffler housing 2 and a lid 3 that seals the muffler housing 2. A catalytic converter element 4 is mounted in the lid 3 and an exhaust pipe 5 leads from the converter element 4 out of the muffler 1. The exhaust gas pipe 5 is located completely in the lid 3, so that the exhaust gases are released to atmosphere via the lid 3. The lid 3 consists of several parts 8, 12, 13 joined together, the parts being shown in the figure in an exploded view.

The lid 3 is thus constructed of an inner plate 12, an outer plate 13 and a cooling air guide plate 8. The converter element 4 is placed between the inner and the outer plates 12 and 13. The converter element 4 is therefore fixed between the plates 12, 13. The three plates 12, 13 and 8 are preferably spot welded together to constitute the lid 3, but may be, of course, joined together in other ways.

The catalytic muffler 1 is mounted to a cylinder of an engine (not shown). The muffler housing 2 is fastened to an exhaust port of the engine with screws inserted through holes 26, 27 and 33. An aperture 25 in the muffler housing 2 corresponds to the engine exhaust port. In the opposite side of the muffler housing 2, there is a big opening, which makes it easy to insert the screws through the holes 26, 27 and 33. Exhaust gases 21 from the exhaust port flow out into the muffler housing 2. A side of the muffler housing, which is hidden in the figure and turned away from the exhaust port aperture 25, is supplied with a fastening plane for the lid 3. The fastening plane has four tapped holes corresponding to the holes 28, 29, 30, 31. The fastening plane also has, as mentioned previously, a big opening. Depressions in the inner plate 12 intended for the converter element 4 and the exhaust gas pipe 5 protrude into this opening. A gasket 24 is placed between the lid 3 and the muffler housing 2. For the sake of clearness the figure shows a part of the gasket 24 placed on the inner plate 12. Please observe that the gasket goes so far towards the middle of the plate that it goes up on the elevated parts of the plate made to house the exhaust gas pipe 5 and the converter element 4. This is also true for an elevated part 23 that is made between the other elevated parts. Therefore the gasket 24 will partly run on the surrounding elevation surrounding the converter element 4 and the exhaust gas pipe 5. The fastening plane of the muffler housing 2 has, as mentioned, an opening corresponding to this surrounding elevation. This opening has chamferred sides. When the lid 3 is assembled the gasket 24 will therefore be compressed between the surrounding elevation and the chamferred sides of the muffler housing 2. In this way a reliable seal is created between the lid 3 and the muffler housing 2.

The exhaust gases 21 from the exhaust port of the engine therefore flow into the muffler housing 2, which is sealed by the lid 3 except for an aperture 20. The exhaust gases flow through the aperture 20 and through the converter element 4, which is fixed between the inner plate 12 and the outer plate 13. In this case, the converter element 4 consists of at least one strip, preferably made from corrugated metal or the like, and coated with a catalyzing layer. The strip is rolled or folded together around a longitudinal axis 6, and the converter element 4 is so located that its longitudinal axis 6 essentially runs parallel to the crankshaft 7. Preferably, the converter element 4 consists of two strips rolled together, one corrugated and one smooth and the strips have been rolled together into a cylindrical element. The cylindrical converter element 4 is pressed between partially cylindrical depressions in the inner and the outer plates 12, 13. Thus, the longitudinal axis 6 of the converter element runs parallel to the fastening plane between the lid 3 and the muffler housing 2, due mainly to the fact that the inner plate 12 and the outer plate 13 have a flat basic shape.

The converter element 4 can also consist of a ceramic converter element, e.g., an element extruded of ceramic material. Such a ceramic element 4 would preferably be surrounded by a resilient material, e.g., a resilient mat or sleeve, and would be placed between the plates 12, 13. The resilient material is preferably used mainly because the ceramic element and the surrounding plates have different coefficients of thermal expansion.

After the exhaust gases 21 have passed through the converter element 4 and cleaned therein, the clean exhaust gases proceed in an exhaust gas pipe 5, which is integrated in the lid 3, and proceed to an exit 16. The exit 16 can be formed by stamped apertures in the outer plate 13. The exit can also be equipped with a spark arresting net 17, whose function is to catch sparks, so that sparks don't blow out of the muffler 1. The net 17 is preferably placed over the exit 16 and between the plates 12 and 13, but other locations are also possible. The illustrated exhaust gas exit 16 has been designed in the form of so-called gills. The aperture in each of the gills is turned in the opposite direction compared to the direction of flow of the exhaust gases. Thus, the direction of flow of the exhaust gases is turned in the gills 16. At the gills the exhaust stream changes its direction approximately 180°. This change in direction is important since the cooling air guide plate 8 is placed on the outside of the outer plate 13 and the cooling air guide plate 8 directs cooling air for mixing with the exhaust gases and for cooling the converter element 4.

The cooling air guide plate 8 is placed in an outermost position on the lid 3, and consists of an outer guide plate 9. The outer guide plate 9 collects and directs cooling air 10 from the cooling fan of the engine between the guide plate 9, parts of the lid 3 placed inside or under the guide plate 9, and a number of abutments 11 which attach the guide plate 9 to inner lid parts, by means of, e.g., screws and/or welding. The guide plate 9 has an upstream edge 32, and after the cooling air guide plate 8 has been assembled to the other lid plates 12, 13, the upstream edge 32 will be situated well outside the side of the plates 12 and 13. When all three plates 8, 12, 13 have been joined together, e.g., by spot welding, the holes 29, 29' and 29" will be in correspondence with each other and the holes 28, 28', 28" will be in correspondence with each other, where '-designations have been used for holes in the outer plate 13 and "-designations for holes in the cooling air guide plate 8. The upstream edge 32 of the outer guide plate 9 is directed almost parallel with the side of the muffler housing 2. Down stream of the edge 32 the outer guide plate 9 turns almost through 90° and, thus, the cooling air 10 is guided in parallel with the outside of the outer plate 13. The cooling air 10 will thus mix with the hot exhaust gases 21 so that the mixed exhaust gases will be at a lower temperature.

The cooling air 10 will also sweep over a bulge 19 in the plate 13, the converter element 4 being housed on the inside of the bulge. As the converter element 4 will be very hot this cooling is of great significance. In this case, the outer guide plate 9 of the cooling air guide plate 8 is drawn down towards the outer plate 13 to create a baffle 18. This baffle 18 divides the stream of cooling air 10 into a first part that flows over the exit 16 and a second part that flows over the bulge 19 in the outer plate 13 that serves as a housing for the converter element 4. Thus, it is assured that the cooling air is not unevenly distributed between these two important cooling objects. The baffle 18 can be drawn so far down that its distal surface is on a level with the peripheral abutments 11 or the plate 9. The baffle 18 can thus be used as an abutment 11 so that the cooling air guide plate 8 can be spot welded to the outer plate 13 at the baffle 18 in addition to upper and lower peripheral abutments 11. It is noted that having the baffle 18 extend so that it can be used as an abutment 11 is optional.

After the engine has been stopped the cooling air guide plate 9 works as a heat shield. The air guide plate 9 prevents a user from directly contacting hot parts on the inside of the muffler (i.e., the converter element 4), and the heat they radiate.

As is evident from the figure, the lid 3 consists of, apart from the cooling air guide plate 8 and the converter element 4, essentially the inner plate 12 and the outer plate 13. At least one of the inner plate 12 and the outer plate 13 has a depression turned away from the other plate 12, 13, so that, therefore, the converter element 4 and the exhaust gas pipe 5 can be housed between the plates after these have been joined together. In the illustrated embodiment, the cylindrical converter element 4 has been placed in a space defined by cooperating depressions formed in both the inner plate 12 and the outer plate 13. The depression in the inner plate 12 is preferably bigger than the depression in the outer plate 13. This is desirable because the entire aperture 20 must be located in the inner plate 12. The exhaust gas pipe 5 is, however, in this case preferably formed as a depression in the outer plate 12, the inner plate 13 remaining essentially flat and covering the open side of the depression to define the pipe. There is also a local bulge 33 in the outer plate 13 located just in front of the exit 16. This bulge 33 creates a local throttling and a certain change of the direction of flow towards the exit 16 that is desirable.

The preferred and illustrated embodiment with a converter space and an exhaust gas pipe 5 formed between two plates 12, 13 is very desirable from many points of view, not least out of the cost reduction point of view. But it is of course possible, within the scope of the present invention, to use other structural elements. The converter element 4 could, for example, be placed in a housing, cylindrical or with another shape, which leads to an exhaust gas pipe 5, which in this case is formed of a pipe with suitable shape. The converter housing and the exhaust gas pipe would then be fastened to a plate corresponding to the inner plate 12, and the outer plate 13 could be deleted. An important basic principal is that both the converter element 4 and the exhaust gas pipe 5 are located in the lid 3. The converter element 4 or its fastening has, in many applications, such a design that its sensitivity to vibrations is different in different directions. The converter element 4 is, in the present case, so located in the lid 3 that the direction in which the element or its fastening is most sensitive to vibrations is essentially parallel to the crankshaft 7 of the engine. This applies for the shown embodiment, and has increased the useful life of the converter element 4.

A throttling can be made in the exhaust gas pipe 5 between the converter element 4 and the exhaust gas exit 16 out of the lid 3. In the present and illustrated case, throttling is provided by a throttling washer 15 fixed between the inner and outer plates 12, 13 and located in front of the exit 16. An advantage of providing throttling by means of a throttling washer 15 is that an accurate throttling can be achieved. Throttling can, alternatively, be provided by a contraction in the exhaust gas pipe 5 by way of a decreased depression in one or both of the plates 12, 13, or one plate 12, 13 can be made with a bulge which decreases the area of the channel. Throttling is used to throttle or restrict the engine on the exhaust side to get decreased exhaust emissions. Preferably, throttling occurs close to the exit 16. Of course, it would also be possible to provide the throttling directly in the exit 16 or in the spark arresting net 17. However, a disadvantage of forming the throttling at the exit 16 is that many users of the product, e.g., a chain saw, could then decrease the throttling or take it away to increase the engine output in this way. This would accordingly increase the exhaust emissions and bring a distinct risk of decreased cooling of the exhaust gases.

Further it can be noted that the engine's aperture 20, which lets the exhaust gases 21 into the converter element 4, usually has a smaller area than the intake area of the converter element. This results in an increased silencing effect. Also the location in the space inside the muffler housing 2 is important for the silencing effect. Preferably the aperture 20 is located on approximately half of the space distance from the volume center of the muffler 1 to a closely situated corner 22.

The shown embodiment refers to a muffler with two mutually demountable parts. It is, however, also possible to design the muffler in one part. In this case, the lid is permanently mounted to the muffler housing 2, for example, by way of welding, soldering or folding, and thereby the gasket 24 can possibly be eliminated. The mounting of the muffler 1 to the cylinder of the engine is arranged so that the mounting screws of the muffler can be reached from the outside of the muffler for mounting or demounting. In one version, long mounting screws are used, piercing special holes in the lid 3. The holes, not shown in FIG. 1, are located so that they correspond with the holes 26, 27, and preferably, lie by the side of the exhaust gas pipe and the catalytic converter element. This leads to long screws exposed to high temperatures. Also, as an alternative, two pipes can be mounted between the front side and the back side of the muffler, which is the usual for single part mufflers. Tunnels are hereby created leading to the mounting holes 26, 27, respectively, and short mounting screws can be used. Another alternative, as well-known, is to provide the muffler with a mounting flange. This will, however, increase the building length.

What is claimed is:

1. A muffler for an engine having a crankshaft, said muffler comprising a muffler housing (2), a lid (3) closing the muffler housing to form an sealed space within the housing, said lid having an inlet (20) in fluid-flow communication with the sealed space and an exit (16) in fluid-flow communication with ambient, wherein said lid includes an exhaust gas pipe (5) communicating said inlet of said lid with said exit of said lid and located within the lid, and a catalytic converter element (4) within said lid and along said exhaust gas pipe, whereby exhaust gases are released from the housing via the lid (3) through the exhaust gas pipe and catalytic converter element.

2. A muffler according to claim 1, wherein a sensitivity of the converter element (4) to vibrations is different in different directions, said converter element being most sensitive to vibrations in a direction which is essentially parallel to the crankshaft (7) of the engine.

3. A muffler according to claim 2, wherein the catalytic converter element (4) is composed of at least one strip that is coated with a catalyzing layer, said strip being rolled or folded together around a longitudinal axis (6), said converter element being disposed such that the converter longitudinal axis (6) essentially runs parallel to the crankshaft (7).

4. A muffler comprising a muffler housing (2), a lid (3) closing the muffler housing to form an sealed space within the housing, said lid having an inlet (20) in fluid-flow communication with the sealed space and an exit (16) in fluid-flow communication with ambient, wherein said lid includes an exhaust gas pipe (5) communicating said inlet of said lid with said exit of said lid and located within the lid, and a catalytic converter element (4) within said lid and along said exhaust gas pipe such that exhaust gases are released from the housing via the lid (3) through the exhaust gas pipe and catalytic converter element, wherein the lid includes an outer plate (13) closing the housing, a cooling air plate (8) placed in an outermost position on the outer plate, the cooling air plate (8) comprising an outer guide plate (9) that collects and directs cooling air (10) from the cooling fan of the engine between the guide plate, the outer plate, and a number of abutments (11) that connect the outer guide plate (9) to the outer plate.

5. A muffler according to claim 4, wherein the lid (3) also includes an inner plate (12), at least one of the inner plate (12) and the outer plate (13) having a depression turned away from the other of said inner and outer plates (12, 13), so that the converter element is received between the inner and outer plates.

6. Muffler with catalytic converter (1) according to claim 5, wherein the converter element (4) is composed of at least one strip rolled together around a longitudinal axis (6) to form a cylindrical structure, and depressions are made in the inner plate (12) and the outer plate (13) which together receive the converter element between said inner and outer plates, said inner and outer plates, apart from the depressions, having a flat basic shape, the longitudinal axis (6) running parallel to the plane of contact between the inner and outer plates (12, 13).

7. A muffler according to claim 5, wherein the converter element (4) is a ceramic converter element, is surrounded by a resilient material, and is disposed between the plates (12, 13).

8. A muffler with catalytic converter (1) according to claim 5, wherein said exhaust gas pipe (5) includes a throttling restriction between the converter element (4) and said exit (16).

9. A muffler according to claim 8, wherein the throttling restriction is a throttling washer (15) fixed between the inner and outer plates (12, 13) and located immediately upstream of the exit (16).

10. A muffler in accordance with claim 8, further comprising a spark arresting net (17) covering said exit (16).

11. A muffler in accordance with claim 4, wherein the outer guide plate (9) of the cooling air plate (8) has a baffle (18) extending towards the outer plate (13), said baffle dividing the stream of cooling air (10) into a first portion that flows over the exit (16) and a second portion that flows over a portion of the outer plate adjacent the converter element.

12. A muffler according to claim 5, wherein said housing has four corners and said inlet of said lid is an aperture (20) formed in said inner plate that admits exhaust gases (21) to the converter element (4), the aperture (20) being approximately located half way between a volume center of the muffler and a nearest one of said corners of said housing.

13. A muffler according to claim 5, wherein the inner plate (12) has an elevated part and further comprising a gasket (24) surrounding said elevated part and compressed between said lid and said housing to form a seal.

14. A muffler according to claim 1, wherein the muffler housing and the lid are welded to one another.

15. A muffler according to claim 1, wherein the lid is releasably secured to the muffler housing.

* * * * *

UNITED STATES PATENT AND TRADEMARK OFFICE
CERTIFICATE OF CORRECTION

PATENT NO.  : 5,736,690
DATED       : April 7, 1998
INVENTOR(S) : Karlsson

It is certified that error appears in the above-identified patent and that said Letters Patent is hereby corrected as shown below:

Title page,

In Section [30], Foreign Application Priority Data, please
    correct application numbers as follows:
    Jul. 18, 1994 [SE]  Sweden ...........9402506-1
    Jan. 17, 1996 [SE]  Sweden ...........9600204-3

Signed and Sealed this

Thirtieth Day of June, 1998

*Attest:*

BRUCE LEHMAN

*Attesting Officer*        *Commissioner of Patents and Trademarks*